INVENTOR.
PERCY EDGAR HALL
BY *O. H. Fowler*
ATTORNEY

Patented Aug. 28, 1934

1,971,608

UNITED STATES PATENT OFFICE 1,971,608

BRAKE

Percy Edgar Hall, Birmingham, England, assignor to Bendix Aviation Corporation, South Bend, Ind., a corporation of Delaware Application September 3, 1932, Serial No. 631,687
In Great Britain September 4, 1931

6 Claims. (Cl. 244—2)

This invention relates to controls for operating brakes, especially those associated with the landing wheels on aircraft.

Brakes are generally fitted to the landing wheels of aircraft to reduce the length of travel required after landing. It is also common practice to provide means for applying the brakes to the wheels of an airplane unequally to facilitate turning and manoeuvring of the airplane on the ground.

According to this invention, the brakes on the wheels of an airplane are adapted to be applied simultaneously from a hand lever through operating mechanism coupled to the rudder-bar or to pedals on or adjacent the rudder-bar in such a way that the operating mechanism may be controlled from the rudder-bar or pedals to apply either brake independently of the hand lever, or to apply either brake with greater force when both brakes have been already applied by means of the hand lever.

An object of the invention is to provide suitable controls for the brakes associated with the wheels on aircraft and to so arrange the controls that the brakes may be applied with any desired degree of force from a hand lever or from a rudder bar. The application of the brakes may be accomplished with either equal or different pressures.

Another object of the invention is to provide means whereby unequal application of the brakes associated with the wheels on aircraft from the hand lever through faulty adjustment of the brakes or for any other reason may be corrected from the rudder bar.

A feature of the invention is a floating equalizing bar connected between a hand operated lever and foot pedals positioned for angular movement on a rudder bar.

Another feature of the invention is a floating equalizing bar connected by cross-cables to pedals on a rudder bar and brake operating cables having running connections with the equalizing bar, and a cable connecting the operating cables to a hand operating lever.

Other objects and features of the invention will appear from the following description taken in connection with the drawing, which forms a part of this specification, and in which.

Figure 1:
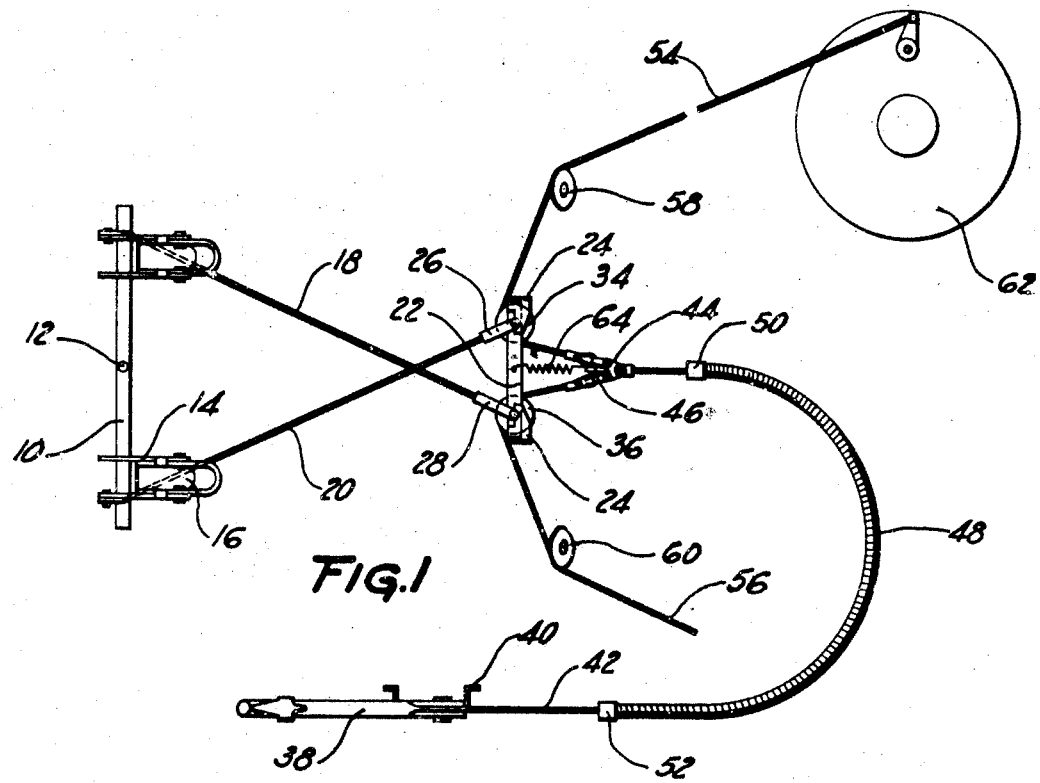
Figure 1 is a diagrammatical illustration embodying the invention.

In the preferred embodiment of the invention, a rudder bar 10 pivotally mounted as at 12 has attached thereto suitable stirrups 14 in which are pivotally supported pedals 16 connected as by cables 18 and 20 to the respective ends of a compensating bar 22 supported by suitable brackets 24 secured in a fixed position on the plane.

As shown, the cables are crossed, the object of which will hereinafter appear, and are connected to clevises 26 and 28 pivotally secured to the compensating bar as by bolts 30 and 32, and the bolts support for rotation suitable pulleys 34 and 36.

A hand operating lever 38 pivoted on a fixed support 40 is connected by a cable 42 to a bifurcated member 44 straddling a fixed stop 46. Preferably the cable 42 extends through a conduit 48 secured at its respective ends to fixed stops 50 and 52 to provide effective operation thereof.

Connected to the respective ends of the bifurcated member 44 are cables 54 and 56. These cables are passed over the pulleys 34 and 36 and suitable supports such as pulleys 58 and 60, and are connected respectively to the actuated members of brakes 62, only one of which is shown.

The equalizing bar 22 is connected to the fixed stop 46 by a spring 64. This spring serves to return the brakes to the off position when the applied force is released.

Figures 2, 3:
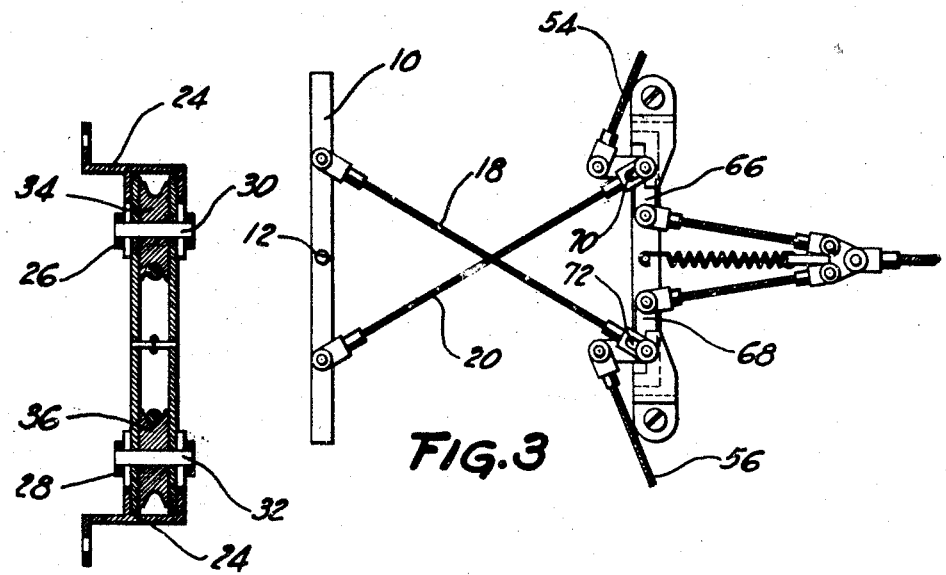
Figure 2 is a sectional view substantially on line 2—2, Figure 1.
Figure 3 is a diagrammatical illustration of a modified form of the invention.

An alternative form of the invention is shown in Figure 3. In this embodiment of the invention, the rollers or pulleys 34 and 36 are replaced by bell crank levers 66 and 68 connected in the cables 54 and 56, and the fulcrums of the levers are connected through over-running connections 70 and 72 to the cables 18 and 20. In all other respects this modification is the same as the preferred form.

Normally, when the hand lever is operated to apply the brakes, both brakes are applied with equal force. In this operation the equalizing bar remains in its normal position on the brackets. If through faulty adjustment of the brakes or for any other reason, the brakes are not applied equally, and the plane tends to turn to one side or the other, this tendency may be corrected by an appropriate movement of the rudder bar or brake pedal to rock the compensating bar and to move one end of the compensating bar and the pulleys or bell cranks thereon away from one of the brackets, resulting in tightening up on one of the operating cables, and loosening up on the other to equalize the applied force.

When manoeuvring a plane on the ground with the hand operating lever in the off position, either of the brakes may be applied by movement of the rudder bar or the appropriate pedal, this movement drawing one pulley or bell crank forwardly away from its supporting bracket. When the pulleys or bell crank levers are connected to the rudder-bar only one wheel may be braked at a time by movement of the rudder bar, and the braking effect will operate in conjunction with the effect of the usual vertical rudder. A suitable degree of lost motion is provided in the connection between the rudder bar and the pulleys or bell crank levers to permit the normal movement of the rudder bar for controlling the rudder in flight to take place without introducing the additional resistance of the brake-applying mechanism.

Where the pulleys or bell crank levers are connected to independent pedals mounted on the rudder bar, the introduction of lost motion is unnecessary, the additional effort required on either brake to correct unequal application being applied directly from the appropriate pedal.

When the brakes are applied by the hand lever, the compensating bar remains stationary. However, if the braking effect on the wheels is unequal, it may be equalized by rocking the compensating bar to increase and decrease the tension on the respective cables connected to the operating cams of the brake.

Although this invention has been described in connection with certain specific embodiments, the principles involved are susceptible of numerous other applications which will readily occur to persons skilled in the art. The invention is, therefore, to be limited only as indicated by the scope of the appended claims.

Having thus described the various features of the invention what I claim as new and desire to secure by Letters Patent, is:

1. A control mechanism for airplanes comprising brakes, a rudder bar, a compensating bar, brackets supporting the compensating bar, members connecting the respective ends of the rudder bar to the opposite ends of the compensating bar, a fixed stop adjacent the compensating bar, tension members having running connections to the compensating bar and connected to and operating said brakes, a member connecting the tension members and engaging the fixed stop and an operating cable connected to the member engaging the fixed stop.

2. A control mechanism for airplanes comprising a rudder bar, a compensating bar, brackets supporting the compensating bar, a fixed stop, a spring connecting the compensating bar to the fixed stop, members connecting the rudder bar to the compensating bar, tension members attached to the actuating members of brakes and having running connections to the compensating bar, a member engaging the fixed stop and connected to the tension members, and operating means connected to the member engaging the fixed stop.

3. A control mechanism for airplanes comprising a rudder bar, a compensating bar, brackets supporting the compensating bar, a fixed stop associated with the brackets, a spring connecting the compensating bar to the fixed stop, members connecting the rudder bar to the compensating bar, members pivoted on the respective ends of the compensating bar, a member engaging the fixed stop, a pair of brakes, tension members connecting the actuating lever of the brakes with the member engaging the fixed stop and having running connections with the members pivoted on the compensating bar, and operating means connected to the member engaging the fixed stop.

4. A control mechanism for airplanes comprising a rudder bar, a compensating bar, members connecting the rudder bar to the compensating bar, brackets supporting the respective ends of the compensating bar, a fixed stop associated with the brackets, a spring connecting the compensating bar to the fixed stop, a pulley on each end of the compensating bar, a member straddling the fixed stop, a pair of brakes, tension members connecting the actuating levers of the brakes to the members straddling the fixed stop and passing over the pulleys on the compensating bar, and operating means connected to the member straddling the fixed stop.

5. A control mechanism for airplanes comprising a rudder bar, a compensating bar, members connecting the rudder bar to the compensating bar, brackets supporting the compensating bar, a fixed stop, a spring connecting the compensating bar to the fixed stop, bell crank levers pivoted on the compensating bar, a pair of brakes, tension members connecting the actuating members of the brakes to the bell crank lever, a member straddling the fixed stop, tension members connecting the member straddling the fixed stop to the bell crank lever, and a cable connecting the member straddling the fixed stop to an operating lever.

6. A control mechanism for airplanes comprising a rudder bar, a compensating bar, members connecting the rudder bar to the compensating bar, brackets supporting the compensating bar, a fixed stop, a spring connecting the compensating bar to the fixed stop, bell crank levers pivoted on the actuating bar for angular movement, an operating cable, a pair of brakes, and tension members connecting the operating cable and the actuating levers of the brakes through the bell crank levers.

PERCY EDGAR HALL.